United States Patent [19]
Nito et al.

[11] Patent Number: 5,993,971
[45] Date of Patent: Nov. 30, 1999

[54] OPTICAL INFORMATION RECORD MEDIUM

[75] Inventors: Keiichi Nito; Tohru Nagai, both of Tokyo; Tsutomu Noguchi, Kanagawa; Mayumi Miyashita, Kanagawa; Junetsu Seto, Kanagawa; Katsumi Kohno, Miyagi, all of Japan

[73] Assignee: Sony Corporation, Tokyo, Japan

[21] Appl. No.: 08/063,052

[22] Filed: May 19, 1993

Related U.S. Application Data

[63] Continuation of application No. 07/737,033, Jul. 29, 1991, abandoned, which is a continuation of application No. 07/098,806, Sep. 21, 1987, abandoned.

[30] Foreign Application Priority Data

Sep. 20, 1986 [JP] Japan .................................. 61-222939

[51] Int. Cl.$^6$ ...................................................... B32B 27/36
[52] U.S. Cl. .......................... 428/412; 428/900; 430/945; 528/204
[58] Field of Search .................... 428/412, 900; 430/945; 528/204

[56] References Cited

U.S. PATENT DOCUMENTS 4,631,334  12/1986  Masumoto et al. ...................... 528/504

FOREIGN PATENT DOCUMENTS

| 0175905 | 4/1986 | European Pat. Off. . | |
|---|---|---|---|
| 0177713 | 4/1986 | European Pat. Off. . | |
| 61-213218 | 9/1986 | Japan | 528/204 |
| 62-196127 | 8/1987 | Japan . | |
| 63-089539 | 4/1988 | Japan | 528/204 |

*Primary Examiner*—William Krynski
*Assistant Examiner*—J. M. Gray
*Attorney, Agent, or Firm*—Hill & Simpson

[57] ABSTRACT

There is disclosed an optical information record medium having an optical information record layer on a transparent substrate, in which the transparent substrate is made of a resin material mainly consisting of a polycarbonate resin that contains no more than 4 wt % of low molecular weight fractions having a weight average measured with respect to a polystyrene molecular weight of no more than 3500, in order to avoid a double refraction of an optical information record medium resulting in an improved signal to noise ratio and having superior thermal-transformation resistance and impact resistance.

6 Claims, 2 Drawing Sheets

OPTICAL INFORMATION RECORD MEDIUM

This is a continuation of application Ser. No. 07/737,033, filed Jul. 29, 1991, now abandoned, which is a continuation of application Ser. No. 07/098,806 filed Sep. 21, 1987, now abandoned.

BACKGROUND OF THE INVENTION

This invention relates to an optical information record medium such as an magneto-optical recording disk, write once type optical disk, compact disks, etc., and more particularly to an improved polycarbonate resin used as a substrate material for such record medium.

The optical record system provides such characteristics, or advantages, as handiness that enables non-contact recording/reproduction, high durability against dirt or scratches, and a storage capacity several tens or hundreds times greater than a magnetic record system, for example, that they are not only utilized as so-called compact disks wherein audio signals signals are digitally recorded or video, but also are expected to be used in filing code information or image information with great storage capacity.

Among the optical information record medium, there is a wide variety of write once type optical disks, or magneto-optical disks, other than the aforementioned compact disks. However, they all have an optical information record layer formed on a transparent substrate. Furthermore, the substrate material must meet certain requirements and characteristics. For instance, the following features of the substrate material are indispensable: (1) a material having thermal resistance at the time of melt molding and can be molded with ease; (2) a material that is not deformed or changed in quality after disk molding, (3) a material having supreme mechanical characteristics, (4) a material having a small double refraction due to, for example, a molecular orientation, a matter of which is important during recording/reproduction. The following materials meet these demands: poly methyl methacrylate resins, polycarbonate resins, polymethyl pentene resins, or polystyrene resins, and so on.

Among them, polycarbonate resin is superior with respect to the aforementioned points (1) to (3), and is the most hopeful substrate material of the optical information medium. For example, in Japanese Patent Publication without examination Nos. 60-155424, 61-4726, 61-16962, 61-19656, 61-55116 and 61-55117, there are disclosed optical disks with polycarbonate resins.

However, the polycarbonate resin suffer the disadvantage of having a large double refraction at the time of disk molding because of its molecular structure. Particularly, it is indispensable for an magneto-optical disk, for example, to minimize the double refraction caused in the transparent substrate, thus the occurence of the double refraction is a serious problem for it.

Therefore, in order to use a polycarbonate resin as the transparent substrate of this kind, one must reduce the double refraction that occurs at the time of molding.

OBJECT OF THE INVENTION

In view of the foregoing, it is an object of the present invention to define the cause of the double refraction that results from the polycarbonate itself and prevent it from occurring. It is a further object of the present invention to provide an optical information record medium that is superior in its mechanical and molding characteristics and has a low noise level.

DESCRIPTION OF THE PRESENTLY PREFERRED EMBODIMENT

Figure 1:
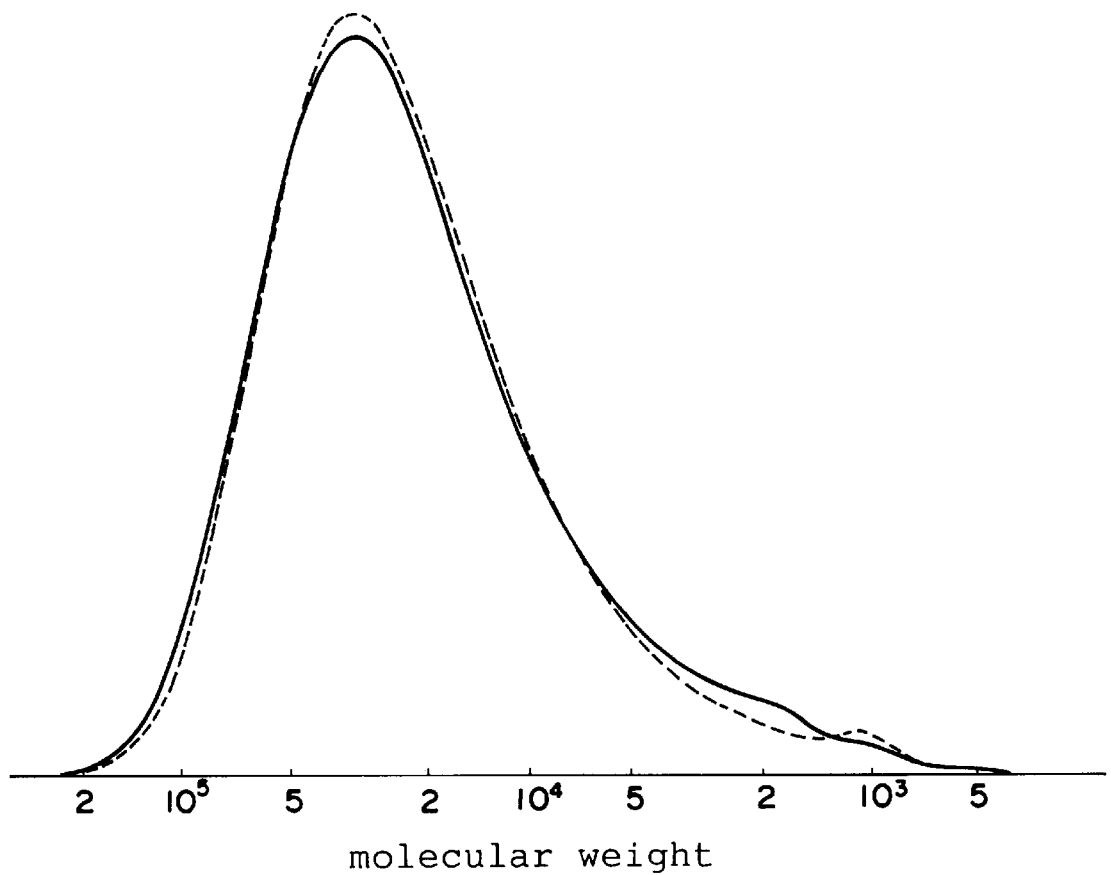
FIG. 1 illustrates a comparison of the molecular weight distribution before and after a refining of a polycarbonate resin.

We have studied the cause of the double refraction occurrence in the polycarbonate substrate, and two dominant causes were found. First, with respect to the double refraction that occurs on the entire surface of the substrate, the inventors of the present invention have found that the double refraction is caused due to the orientation of the polycarbonate molecule at the time of substrate molding, and due to the internal distortion at the time of the cooling process and removing it during substrate molding. These double refractions can be reduced by providing the most suitable molding conditions, thus it is possible to produce such a resin having a small double refraction on the entire surface of the substrate.

Secondly, there has been found an abnormal double refraction that partially occurs in the substrate, wherein the error rate increases. The abnormal double refraction is caused due to the existence of foreign materials inside or adjacent to the surface of the substrate. Among these foreign materials, are materials from the molding machine, for example, which can be removed by providing a surface treatment on the molding machine.

It has been proved, however, that the abnormal double refraction that partially occurs is caused not only by material from the molding machine, but also due the polycarbonate itself.

The inventors of the present invention have found that the polycarbonate resin on the market contains 4 to 6% of factions of a weight-average molecular weight measured with respect to a polystyrene molecular weight of no more than 3500. The inventors have determined that these low molecular weight fractions segregate at the time of molding of the substrate molding and in the process of producing a record medium and cause the abnormal double refraction, that is, the cause of noise.

The present invention provides an optical information record medium having an optical information record layer on a transparent substrate, and was accomplished based on this knowledge. The invention is characterized in that the transparent substrate is made of a resin material mainly consisting of a polycarbonate resin that contains no more than 4 wt % of the low molecular weight fractions having weight-average molecular weight measured with respect to polystyrene molecular weight of no more than 3500.

In the optical information record medium of the present invention, the polycarbonate resin used as the substrate material is manufactured by a phosgene process in which a dihydric phenolic compound is reacted with phosgene under the presence of an acid binder and a solvent. The polycarbonate resins include a branched polycarbonate resin using a multi-functional organic compound with more than three functionalities and having a phenolic hydroxyl group as a branching agent, a long-chain alkyl terminated polycarbonate resin using one-functional organic compound such as a long-chain alkyl acid chloride or a long-chain alkyl ester substituted phenol as a terminator, a long-chain alkyl terminated and branched polycarbonate resin using the aforementioned branching agent and terminator, and mixture of these compounds, other than a usual polycarbonate resin. The polycarbonate resin used at the time of substrate molding has a weight average molecular weight of 10,000 to 100,000. Examples of a dihydric phenolic compound for the polycarbonate resin, include a bis(4-hydroxyphenyl) methane, 1,1-bis(4-hydroxyphenyl)ethane, 2,2-bis(4-hydroxyphenyl) propane, 2,2-bis(4-hydroxyphenyl)butane, 1,1-bis(4-hydroxyphenyl)cyclohexane, 2,2-bis(4-hydroxy-3,5-dibromophenyl) propane, 2,2-bis(4-hydroxy-3,5-dichlorophenyl) propane, 2,2-bis(4-hydroxy-3-bromophenyl)propane, 2,2-bis (4-hydroxy-3-chlorophenyl) propane, 2,2-bis(4-hydroxy-3,5-dimethylphenyl)propane, bis(4-hydroxyphenyl)ether, bis (4-hydroxyphenyl)sulfone, bis(4-hydroxyphenyl)sulfoxide, bis(4-hydroxyphenyl) sulfide, bis(4-hydroxyphenyl)ketone, 1,1-bis(4-hydroxyphenyl)-1-phenylethane, bis (4-hydroxyphenyl) diphenylmethane, etc.

On the other hand, as the branching agent, there can be used, for example, polyhydroxy compounds such as phloroglucin, 2,6-dimethyl-2,4,6-tri(4-hydroxyphenyl) heptene-3, 4,6-dimethyl-2,4,6-tri(4-hydroxyphenyl) heptene-2, 1,3,5-tri(2-hydroxyphenyl)benzole, 1,1,1-tri(4-hydroxyphenyl)ethane, 2,6-bis(2-hydroxy-5-methylbenzyl)-4-methylphenol, α,α',α"-tri(4-hydroxyphenyl)-1,3,5-triisopropylbenzene, and 3,3-bis (4-hydroxyaryl)oxyindole, 5-chloroisatin, 5,7-dichloroisatin, 5-bromoisatin, etc.

Also, as examples of a one-functional organic compound used as a terminator, there are such fatty acid chlorides as a capryl chloride, a lauryl chloride, a myristyl chloride, a palmitoyl chloride, a stearyl chloride, a cerotyl chloride; fatty acids as a capric acid, a lauric acid, a myristic acid, a palmitic acid, a stearic acid, a cerotic acid; long-chain alkyl permutation phenols as an octyl phenol, a nonyl phenol, a lauryl phenol, a palmitic phenol, a stearyl phenol; long-chain alkyl ester hydroxybenzoates such as an octyl hydroxybenzoate, a lauryl hydroxybenzoate, a nonyl hydroxybenzoate, a stearyl hydroxybenzoate, etc.

In the present invention, the aforementioned polycarbonate resin is refined, in particular, resins excluding fractions having the weight-average molecular weight measured with respect to a polystyrene moleculor weight of no more than 3500 are to be used as the substrate material in an optical information record medium.

For example, studying the distribution of the molecular weight of an available polycarbonate resin illustrated in FIG. 1 by a solid line, a small peak was observed adjacent to weight-average molecular weight measured with respect to a polystyrene molecular weight of 2000. According to an experiment performed by the inventors, it was proved that when the polycarbonate resin containing such low molecular weight elements was used as a substrate material of an magneto-optical recording disk, those low molecular weight fractions were segregated and condensed on the surface of the disk substrate, presenting a so-called transparent spot, and thus caused an abnormal double refraction. It was found that by reducing the molecular fractions become, the fewer the abnormal double refraction that occurred were reduced. Accordingly, in the present invention, in order to prevent the abnormal double refraction, the contents of the low molecular weight fractions having weight average molecular weight measured with respect to polystyrene molecular weight of no more than 3500 are limited to the prescribed level. It should be noted that, the molecular weight of the low molecular weight fractions to be excluded was set to a weight-average molecular weight measured with respect to a polystyrene molecular weight of no more than 3500 after consideration that there is a range to some extent in the distribution of these low molecular weight fractions, and that in order to exclude precisely the fractions corresponding to the peak shown in FIG. 1, it was determined to be preferable to reduce the fractions with the above molecular weight of no more than 3500 so that they were no more than the prescribed level.

Figure 2:
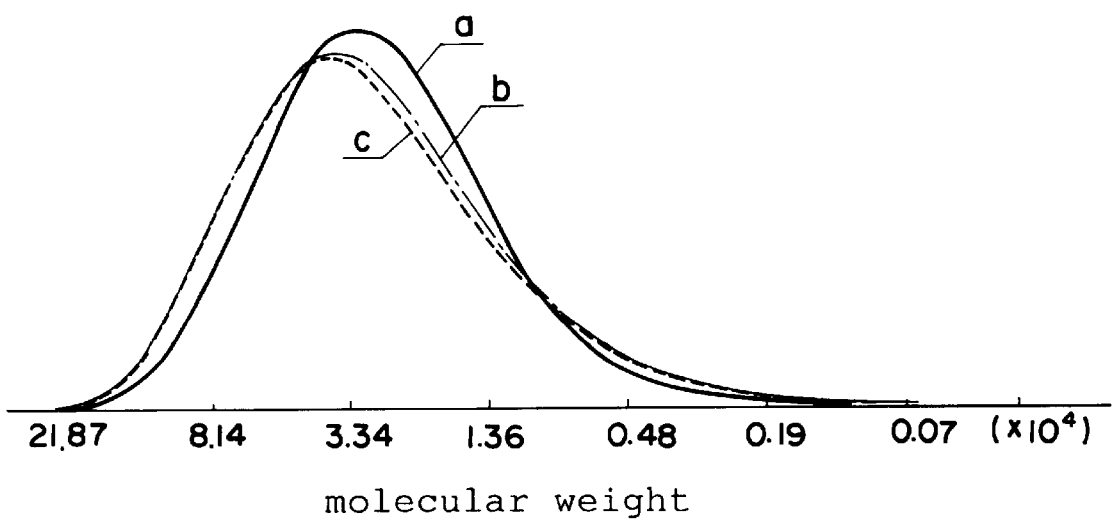
FIG. 2 illustrates the change of the molecular weight distribution due to the heat of the polycarbonate resin.

It should be noted that the contents of the low molecular weight fractions are estimated in the state of being molded in a substrate of an optical information record medium, i.e., an optical disk. As illustrated in FIG. 2, it is due to the increase of the low molecular weight fractions caused by the heat during the substrate molding. This figure illustrates variations of the molecular weight distribution when the substrate was molded using a polycarbonate resin pellet wherein the low molecular weight fractions were excluded, and the low molecular weight fractions were actually increased in the substrate molded at a temperature of 345° C. (shown by line b with a bit in FIG. 2), or in one molded at the temperature of 363° C. (shown by the dotted line c), compared with the pellet (shown by the line a).

Therefore, pursuant to the present invention the contents of the low molecular weight fractions with weight-average molecular weight measured with respect to a polystyrene molecular weight of no more than 3500 in the polycarbonate resin as the substrate material were set to no more than 4 wt %, in the state of being molded in the substrate. The lower the low molecular weight fractions became, the less double refraction occurred the rate being for practical use, below 4 wt %, preferably, 3 wt %. When the contents of the low molecular weight fractions with the molecular weight of no more than 3500 exceeds 4 wt %, the abnormal double refractions occur often, and the material should not be used as a substrate for an optical disk.

Thus, in order to reduce the contents of the low molecular weight fractions in the state of a substrate, it is necessary to refine the polycarbonate resin to be used, previously excluding the low molecular weight fractions. There are several refining processes for the polycarbonate resin, for example, a reprecipitation process can be utilized.

In this case, one way is to refine what was once processed to a pellet, and another way is to refine directly what was dissolved in a methylene chloride in the last phase of the phosgene process.

In the former case, an antioxidant or a parting agent is added to the polycarbonate resin powders obtained by the phosgene process to pelletize them. They are then dissolved in a good solvent such as a methylene chloride or a dioxane, a bad solvent is added thereto such as a methanol or an ethanol so that the polymer precipitates, and after filtering and drying, polycarbonate resin powder is obtained that is then pelletize again to produce a polycarbonate resin pellet.

In the latter case, the processes are as follows. First, a phosgene is blown into a mixture of, for example, a bisphenol A, an alkali solution and a methylene chloride, and after a polycondensation reaction, a terminator is added to it to terminate the reaction. Then, a methylene chloride phase is separated wherein a polycarbonate dissolves. A washing is repeated to remove a sodium chloride, the terminator, or alkali elements. A bad solvent is added directly to the methylene chloride phase, and the polymer precipitates. It is then filtered and dried to remove unreacted monomers or carbonate oligomers to obtain the polycarbonate resin powders. It is pelletize to produce a polycarbonate resin pellet.

The polycarbonate resin pellet thus obtained contains very few low molecular weight fractions as illustrated in FIG. 1 (by the dotted line). By injection molding, the substrate having a few low molecular weight fractions can be molded.

The low molecular weight fractions, with weight average molecular weight measured with respect to a polystyrene molecular weight of no more than 3500 in a polycarbonate resin, present partial segregation when processed into a substrate, and cause a so-called transparent spot. Because of this transparent spot, a burst error, for example, will occur.

In the present invention, the contents of the low molecular weight fractions with a molecular weight of no more than 3500 in a substrate, are restrained to no more than 4 wt % in order to reduce the occurrence of an abnormal double refraction and to lower the noise level.

Also, the reduction of the low molecular weight elements effectively serves to improve the thermal resistance resolution at the time of melting of the polycarbonate resin and the thermal transformation temperature after the molding.

The invention will now be further described according to the results of the specific experiments.

EXPERIMENT EXAMPLE 1 (COMPARISON EXAMPLE)

First, among the unrefined polycarbonate resins, those having different contents of the low molecular weight fractions with weight average molecular weight measured with respect to a polystyrene molecular weight of no more than 3500 were used to mold two kinds of optical disk substrates, and the CN ratio of those substrates were evaluated respectively. In this case, the respective contents of the low molecular weight fractions contained in the polycarbonate resin that form each substrate were 5.5 wt % and 4.8 wt %.

Having measured the CN ratio of each substrate with a career signal of 20 KHz and 100 KHz, it was determined that the substrate having fewer low molecular weight fractions had a better CN ratio by 2 to 3.5 dB.

However, by observing the surface of each substrate with a polarization microscope, luminous points of several microns to several tens of microns were found, thus a presence of the abnormal double refraction was confirmed.

EXPERIMENT EXAMPLE 2

The fact that the low molecular weight fractions have significant influence upon the abnormal double refraction was determined by aforementioned experiment example 1.

Therefore, in this experiment example, we examined what type of compounds form the low molecular weight fractions in the polycarbonate resin.

First, the molecular weight distribution in an available polycarbonate resin was measured by a gel permeation chromatography (GPC) (the packed column material was: Shodex A-800P+A-804, the solvent was tetrahydorfuran). The constitution of the fractions in the weight average molecular weight measured with respect to polystyrene molecular weight of no more than 3500 was determined by gas chromatography mass analysis, nuclear magnetic resonance ($^1$H—NMR, $^{13}$C—NMR), and infrared spectroscopy.

It was determined that, a bisphenol A that is a raw material of the polycarbonate resin, a carbonate oligomer both ends of which are processed with a phenol inducer, and a hindered phenol that is supposed to be an antioxidant, etc. were found to be present. These formula of the constituents are as follows:

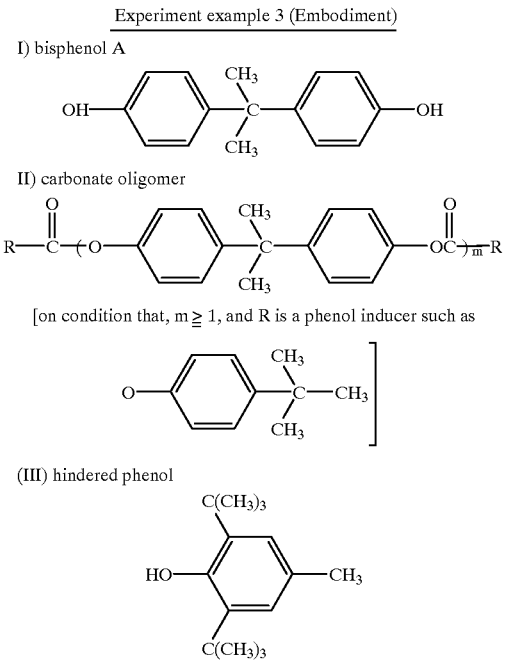

Because the foreign materials found on the substrate surface are the low molecular weight fractions contained in the polycarbonate resin, and the noise level is reduced when there is only a few low molecular weight elements present, a further reduction of them was attempted.

First, 1 kg of a polycarbonate resin was melted into 29 dioxane, heated to a temperature of 80° C., add 20 -ethanol was gradually added during stirring. The precipitated high molecular weight elements were filtered to exclude the low molecular weight fractions. Then, the refined polycarbonate resin was dried under a reduced pressure for ten hours at a the temperature of 120° C., to exclude the remaining dioxane and ethanol. The thus obtained powders were melted, pelletized and used for molding a substrate.

Through this refining process, the low molecular weight fractions with weight average molecular weight measured with respect to polystyrene molecular weight of no more than 3500 was reduced from 5.5 wt % at first to 0.8 wt %. Thus almost all of the carbonate oligomer ($1 \leq m \leq 4$), bisphenol A and hindered phenol were excluded.

Next, using the polycarbonate resin pellets the low molecular weight fractions of which had been reduced to 0.8 wt %, an optical disk substrate was molded through injection molding.

Observing the substrate surface thus obtained with a polarization microscope, no luminous points were found nor did any transparent foreign materials exist on the substrate surface with a abnormal double refraction occurring around them, either.

EXPERIMENT EXAMPLE 4

The results of these experiments demonstrate that the reduction of the low molecular weight contents in the polycarbonate resin effectively prevents the abnormal double refraction. Furthermore, the effects of the low molecular weight fracions on the thermal decomposition characteristic, the thermal-transformation resistance, and the impact resistance, and so on were examined.

With respect to the hydrolysis of the polycarbonate resin by phenols, though it is studied in the report (Poly, Sci. USSR, 4, (6), 1346 (1963)) by B. M. Kovarskaya, et al., there is no example wherein the low molecular weight fractions in the polycarbonate resin are varied systematically to study their thermal decomposition.

Accordingly in the present experiment, such thermal decomposition was examined.

For example, the bisphenol A contained in the polycarbonate resin hydrolyzes the polycarbonate in the process of receiving the heat such as through pelletizing or injection molding, to produce another bisphenol A as a decomposition products, the hydrolysis is further accelerated. Therefore, it is assumed that the hydrolysis can be effectively restrained due to the refinement that excludes the low molecular weight factions.

Figure 3:
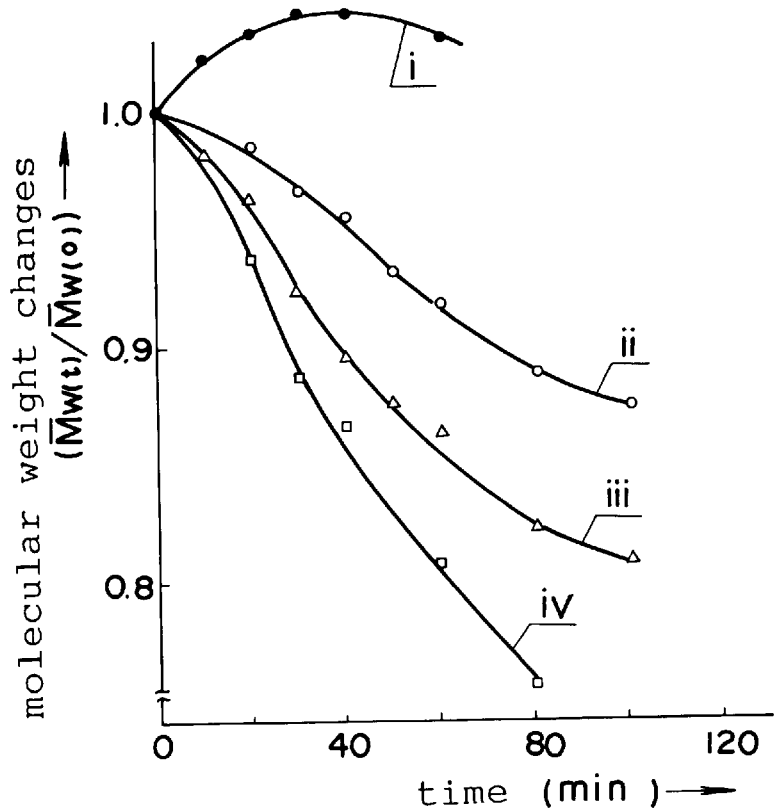
FIG. 3 illustrates the molecular weight changes in accordance with the difference of the contents of the low molecular weight fractions in the polycarbonate resin.

The thermal degradation behavior (cut the molecular chain) of the polycarbonate resin was studied at 360° C. on polycarbonate resin samples containing various amount of the low fractions. The results are illustrated in FIG. 3. It is noted that in the figure, the changes of the molecular weight were given in a ratio Mw(t)/Mw(o) of the average molecular weight Mw(o) prior to the molding and the average molecular weight Mw(t), t minutes after the molding. Also, the respective curves i, ii, iii, and iv illustrate the contents of the low molecular weight fractions of 0.8 wt %, 4.1 wt %, 4.8 wt %, and 5.5 wt %, respectively.

As a consequence, according to the reduction of the contents of the low molecular weight fractions having the weight average molecular weight measured with respect to polystyrene molecular weight of no more than 3500, the reduction of the molecular weight was proved to be restrained. Particularly, since the bisphenol A can completely be excluded by the refining, the decline of the molecular weight, that is, the thermal decomposition was hardly observed in the refined polycarbonate resin.

On the other hand, the thermal transformation resistance was valued by the glass-transition temperature Tg of the polycarbonate resin.

Figure 4:
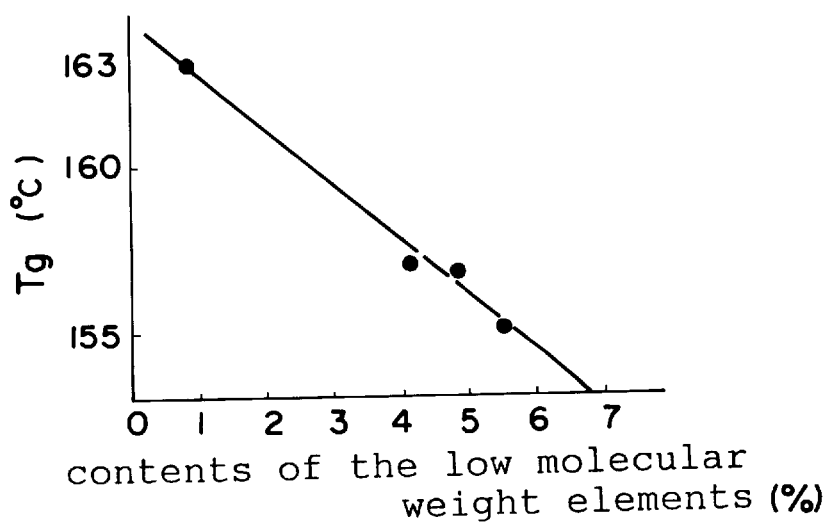
FIG. 4 illustrates the change of the glass-transition temperature according to the difference of the contents of the low molecular weight fractions in the polycarbonate resin.

As illustrated in FIG. 4, the glass-transition temperature Tg obtained from the visco-elastic behavior at 110 Hz of the polycarbonate resin, wherein the low molecular weight fractions are reduced, increases in accordance with the reduction of the low molecular weight fractions having a molecular weight of no more than 3500. And in the refined polycarbonate resin (the contents of the low molecular weight fraction being 0.8 wt %) in the aforementioned experiment example 3, it is 163° C., 8° C. high than available polycarbonate resin (the contents of the low molecular weight fractions being 5.5 wt %), thus, it was found to enormously improve the thermal resistance as a substrate material of an optical disk. Moreover, the impact resistance was also found to be improved.

From the foregoing it is seen that in the present invention, since the contents of the low molecular weight fractions contained in a polycarbonate resin substrate of an optical information record medium are set to no more than 4 wt %, it is possible to reduce the abnormal double refraction (the so-called transparent spot) caused by the foreign material occurring from a segregation or condensation of the low molecular weight fractions, and to lower the noise level.

Also, the reduction of the low molecular weight fractions effectively functions to improve the thermal decomposition of the polycarbonate resin substrate, for example, the thermal degradation of the resin at the time of molding can be restrained.

At the same time, by reducing the low molecular weight elements, the thermal transformation resistance or the impact resistance of the polycarbonate resin substrate can be improved.

In such manner, it is possible to provide an optical information record medium that is superior in mechanical characteristics and that can provide highly reliable recording/reproduction, especially, when applied to an opto-magnetic disk, etc., the utmost effect can be obtained.

We claim as our invention:

1. An optical information record medium comprising a transparent substrate and an optical information recording layer formed on said substrate, wherein said substrate is formed of a polycarbonate resin containing no more than 4 weight percent of low molecular weight fractions having an average molecular weight measured with respect to a polystyrene molecular weight of no more than 3,500, said substrate characterized by insignificant microscopic abnormal double refraction in the resin caused by segregation of these low molecular weight fractions during substrate molding and in production of the record medium as observed under a polarization microscope.

2. The optical information record medium of claim 1 wherein the polycarbonate resin used as the substrate material is manufactured by a phosgene process in which a dihydric phenolic compound is reacted with phosgene in the presence of an acid binder and a solvent.

3. The optical information record medium of claim 2 wherein the dihydric phenolic compound includes a compound chosen from the group consisting of: a bis(4-hydroxyphenyl)methane; 1,1-bis(4-hydroxyphenyl)ethane; 2,2-bis(4-hydroxyphenyl)propane; 2,2-bis(4-hydroxyphenyl)butane; 1,1-bis(4-hydroxyphenyl) cyclohexane; 2,2-bis(4-hydroxy-3,5-dibromophenyl)propane; 2,2-bis (4-hydroxy-3,5-dichlorophenyl)propane; 2,2-bis(4-hydroxy-3-bromophenyl)propane; 2,2-bis(4-hydroxy-3,5-dimethylphenyl) propane; bis(4-hydroxyphenyl)ether; bis(4-hydroxyphenyl)sulfone; bis(4-hydroxyphenyl)sulfoxide; bis(4-hydroxyphenyl) sulfide; bis(4-hydroxyphenyl) ketone; 1,1-bis(4-hydroxyphenyl)-1-phenylethane; and bis(4-hydroxyphenyl) diphenylmethane.

4. The optical information record medium of claim 2 wherein the polycarbonate resin includes a terminator chosen from the group consisting of: capryl chloride; lauryl chloride; myristyl chloride; palmitoyl chloride; stearyl chloride; cerotyl chloride; capric acid; lauric acid; myristic acid; palmitic acid; stearic acid; cerotic acid; long-chain alkyl permutation phenols; octyl phenol; nonyl phenol; lauryl phenol; palmitic phenol; stearyl phenol; long-chain alkyl ester hydroxybenzoates; octyl hydroxybenzoate; lauryl hydroxybenzoate; nonyl hydroxybenzoate; and stearyl hydroxybenzoate.

5. The optical information record medium of claim 1 wherein the polycarbonate resin, at a time of molding of the substrate, has an average molecular weight of approximately 10,000 to about 100,000.

6. The optical information record medium of claim 1 wherein the polycarbonate resin includes a branched polycarbonate resin having multi-functional compounds including a branching agent chosen from the group consisting of: polyhydroxy compounds including phloroglucin, 2,6-dimethyl-2,4,6-tri(4-hydroxyphenyl)heptene-3, 4,6-dimethyl-2,4,6-tri(4-hydroxyphenyl)heptene-2, 1,3,5-tri(2-hydroxyphenyl)benzole, 1,1,1-tri(4-hydroxyphenyl)ethane, 2,6-bis(2-hydroxy-5-methylbenzyl)-4-methylphenol, α,α', α"-tri(4-hydroxyphenyl)-l,3,5-triisopropylbenzene, and 3,3-bis(4-hydroxyaryl)oxyindole, 5-chloroisatin, 5,7-dichloroisatin, 5-bromoisatin.

* * * * *